United States Patent [19]

Linscott, Jr.

[11] 4,250,423
[45] Feb. 10, 1981

[54] GENERATOR WITH STATOR RETENTION

[75] Inventor: Phillip S. Linscott, Jr., Rockford, Ill.

[73] Assignee: Sundstrand Corporation, Rockford, Ill.

[21] Appl. No.: 936,734

[22] Filed: Aug. 25, 1978

[51] Int. Cl.³ .............................................. H02K 1/12
[52] U.S. Cl. .................................... 310/258; 310/64; 310/89; 310/91; 403/29
[58] Field of Search .................... 310/89, 91, 71, 42, 310/58, 59, 51, 64, 113, 114, 217, 65, 254, 258, 259, 216, 218, 52; 29/596, 447; 165/81, 82, 165; 403/28–30

[56] References Cited
U.S. PATENT DOCUMENTS

| | | | |
|---|---|---|---|
| 2,711,008 | 6/1955 | Smith | 29/609 |
| 2,769,933 | 11/1956 | Ballman | 310/217 |
| 2,845,551 | 7/1958 | Potter | 310/87 |
| 3,182,215 | 5/1965 | DuBois | 310/89 |
| 3,229,134 | 1/1966 | Rakula | 310/259 |
| 3,343,016 | 9/1967 | Lewis | 310/91 |
| 3,525,001 | 8/1970 | Erickson | 310/54 |
| 3,772,546 | 11/1973 | Means | 310/91 |
| 3,823,772 | 7/1974 | Lavering | 403/30 |
| 3,988,623 | 10/1976 | Yamaguchi | 310/254 |
| 4,031,421 | 6/1977 | Geiger | 310/112 |
| 4,098,476 | 7/1978 | Jutte | 403/30 |
| 4,151,435 | 4/1979 | Jandeska | 310/42 |

Primary Examiner—R. Skudy
Attorney, Agent, or Firm—Wegner, Stellman, McCord, Wood & Dalton

[57] ABSTRACT

A generator having a stator and a rotor mounted for rotation relative to the stator, a generally cylindrical support structure for the stator either in the form of a housing or a support ring within the housing, said stator and support structure being formed of materials having substantially different thermal expansion rates and the stator having an outer surface engaging an inner surface of the support structure with an interference fit throughout the operating temperature range of the generator, and a plurality of longitudinal grooves formed in one of the surfaces to permit bending of said support structure in the area of said grooves when the generator is operating in the lower part of said temperature range. When the support structure is in the form of a ring, the housing also has a substantially different thermal expansion rate and the ring is supported relative to the housing by a plurality of integral legs associated with the grooves in a manner whereby the grooves each function as a deflecting arch for the adjacent leg whereby the legs maintain an interference fit with the housing throughout the operating range of the generator.

4 Claims, 6 Drawing Figures

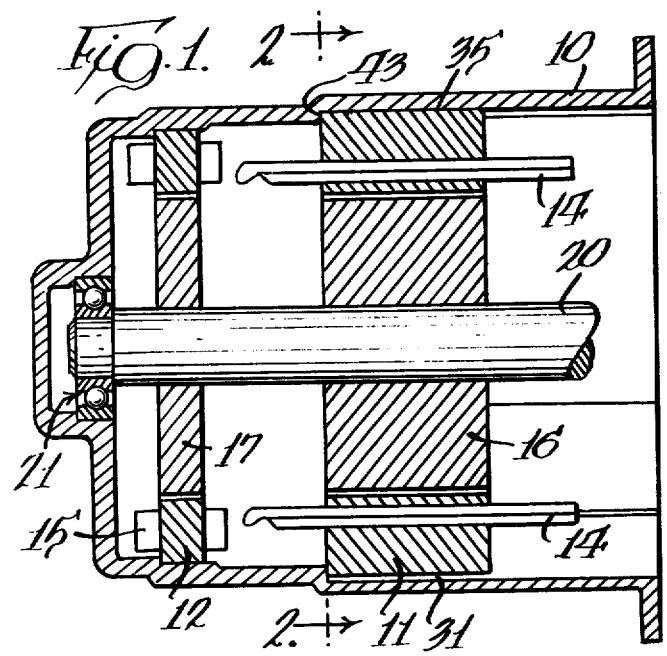
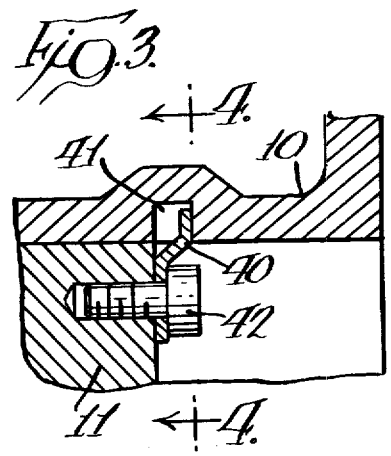
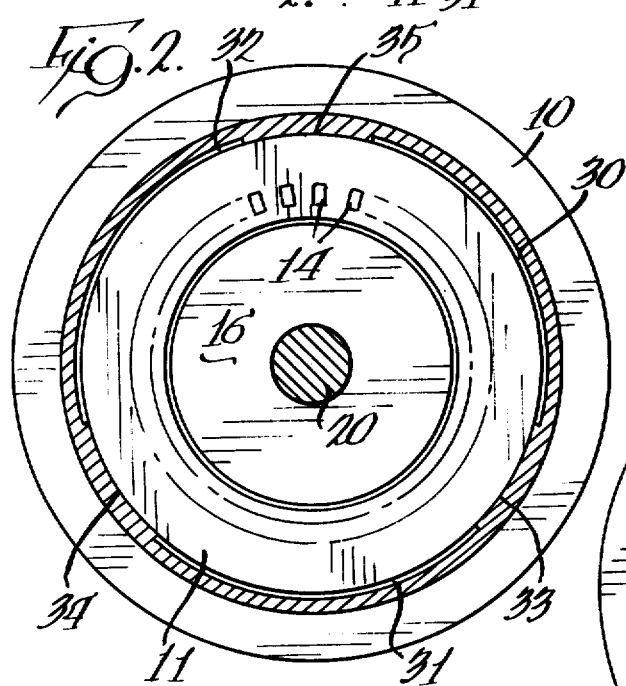
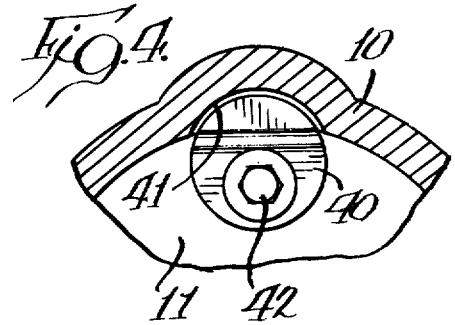
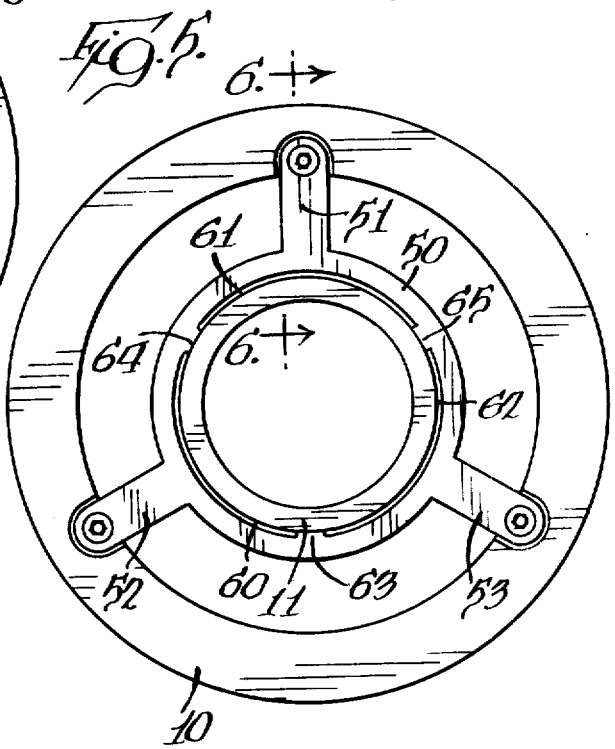
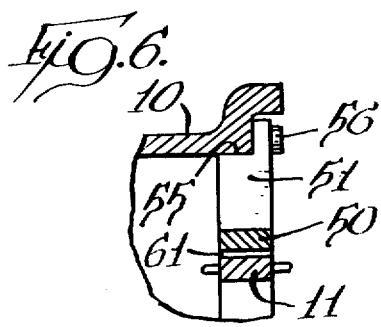

GENERATOR WITH STATOR RETENTION

BACKGROUND OF THE INVENTION

This invention pertains to generators including alternators which must operate over a wide range of temperatures, such as aircraft generators, and with means providing for stator retention in fixed position throughout the operating temperature range of the generator.

Aircraft generators must operate over a wide range of temperatures. Generators are presently being designed and built with spray oil cooling to operate from approximately −65° F. to 355° F. A common construction of the generator has the stator comprised of a winding about an iron core inserted into the bore of a housing and in order to save weight the housing is frequently a magnesium or aluminum casting. It is a requirement that the stator be accurately positioned within the housing, both radially and axially throughout the operating temperature range of the generator. Movement of the stator relative to the housing during operation could cause an electrical failure. One common method used to position stators is to provide an interference fit between the outside surface of the stator and the inside surface of the housing.

Due to the relatively high thermal expansion rates of magnesium or aluminum, as compared to the iron used for the stator core, problems are often encountered in retaining the stator within the housing throughout the complete operating temperature range which, in the example given above, could be 420° F. For example, a magnesium housing can only undergo approximately a 250° F. temperature range without either yielding at the low temperature or permitting the stator to loosen at the higher temperatures. At present in order to extend the temperature range capabilities beyond 250° F., a number of screws are positioned radially through the housing of the generator and in an oil spray cooled generator these screws must be sealed to prevent oil from leaking out of the generator.

SUMMARY OF THE INVENTION

A primary feature of the invention disclosed herein is to provide a generator which will retain the stator in position throughout a large operating temperature range, and with the stator and supporting structure being of materials having substantially different thermal rates of expansion wherein parts are related with an interference fit throughout the range of operating temperatures and are constructed to prevent tensile yielding at the lower temperatures encountered in operation. Additionally, the structure designed to prevent tensile yielding, also provides an improved flow path for cooling oil.

More particularly, in one embodiment of the invention, the stator is mounted within a light metal housing with the parts being assembled to have an interference fit at the highest temperature encountered in operation and thus have an interference fit at lower temperatures to assure accurate positioning and retention of the stator throughout the entire range of operating temperatures. One of the engaging surfaces of the stator or housing has a plurality of longitudinal grooves formed therein to permit bending of the housing in the area of said grooves when the generator is operating in the lower part of the temperature range to result in a stress in the housing wall which is a combination of tensile stress and bending and with the resulting stress levels being less than the equivalent tensile stress which would result without the longitudinal grooves.

In another embodiment of the invention, a structure is provided for location and retention of the stator throughout the operating temperature range wherein the housing is of a size substantially larger than the stator. This structure utilizes a supporting ring surrounding the stator and of a material having a greater rate of thermal expansion than the stator and a lesser rate of thermal expansion than the housing. The surfaces of the ring and stator have an interference fit and with longitudinal grooves formed in one of the members to form deflecting arches for a plurality of integral legs extending radially from the ring into an interference fit relation with the housing whereby the deflecting arches cause the legs to maintain an interference fit with the housing throughout the operating temperature range of the generator.

Additionally, the structures include means for retaining the stator in association with the housing if the maximum temperature normally encountered by the generator is exceeded, as might be caused by the failure of a cooperating piece of equipment.

BRIEF DESCRIPTION OF THE DRAWING

FIG. 1 is a central section, through one embodiment of the generator;

FIG. 2 is a fragmentary vertical section, on an enlarged scale, taken generally along line 2—2 in FIG. 1;

FIG. 3 is a fragmentary elevational view showing auxiliary stator retention structure;

FIG. 4 is a sectional view, taken generally along the line 4—4 in FIG. 3;

FIG. 5 is a view, similar to FIG. 2, of an alternate embodiment of the invention; and FIG. 6 is a fragmentary vertical section, taken generally along the line 6—6 in FIG. 5.

DESCRIPTION OF THE PREFERRED EMBODIMENTS

A first embodiment of the invention is shown in FIGS. 1 to 4 wherein a housing 10, having a generally cylindrical cavity, is formed of a lightweight material such as magnesium having a relatively high rate of thermal expansion. The housing 10 mounts a pair of stators 11 and 12 which are typically constructed of electrical iron laminations, such as vanadium permendur. Each of these stators carries a winding 14 and 15, respectively. Laminated rotor cores 16 and 17 are associated with the stators 11 and 12 and are carried on a common shaft 20 which is rotatably mounted within the housing by bearing means, including a housing-supported bearing 21 positioned at one end of the shaft.

The generator, when used with aircraft, can be expected to encounter temperatures ranging from −65° F. to 355° F. which is an operating temperature range of approximately 420° F. The stators 11 and 12 are associated with the housing 10 with an interference fit therebetween. With the generator exposed to the range of temperatures set forth above, an interference fit is determined which will produce a line-to-line or loose fit somewhat above the maximum operating temperature, as 400° F., for example. At any temperature less than 400° F., the interference fit condition exists between the outer diameter of the stators 11 and 12 and the inner diameter of the housing 10. In this way, the stator will always be accurately positioned and retained throughout the operating temperature range. This mode of assembly can be obtained by assembling the stators into the housing, with the housing at an elevated temperature.

In order to prevent the housing 10 from tensile yielding or the stator from compressive yielding at the lower temperatures to which the generator is exposed, a series of longitudinal grooves or cut-outs 30, 31 and 32 are provided on the interior surface of the housing. Alternatively, these grooves or cut-outs could be formed on the exterior surface of the stator. These longitudinal grooves leave intermediate portions 33, 34 and 35 of the inner surface of the housing which are in interference fit relation with the exterior surface of the stator. In the lower operating temperature area, the unsupported arches of the housing, which are the parts thereof between the sections 33, 34 and 35 are permitted to deflect by bending whereby the housing wall is stressed in a combination of tensile and bending and the resulting stress levels are less than an equivalent tensile stress resulting from the same interference fit but without the longitudinal grooves or cut-outs 30–32.

The longitudinal grooves 30–32 also provide a path for oil flow in the generator between opposite ends thereof. When used in an aircraft, the cooling oil is required to pass from one end of the generator to the other during inclines caused by aircraft maneuvers and without the longitudinal grooves the oil would have to pass through the air gap between the rotor and stator which is undesirable since high windage losses result. The structure also provides a degree of back iron cooling. The cooling oil can contact all surfaces of the stator, with the exception of the areas in interference fit relation with the housing, thereby effectively removing heat from the stator assembly and consequent improvement in life of the insulation system.

Although three longitudinal grooves or cut-outs have been shown, a larger number could be employed if desirable and by choosing the initial interference fit, housing wall thickness, and ratio of interference fit area to groove area, a wide range of spring rates and retaining forces or pressures can be obtained.

A structure to assure retention of the stator in position if the maximum operating temperature of the generator is exceeded is shown in FIGS. 3 and 4. A plurality of spring clips are associated with the stator and the housing in equally spaced relation and with one of the spring clips 40 shown in FIGS. 3 and 4. Spring clip 40 fits within a slot 41 of the housing 10 and, by means of a torquing screw 42, the stator 11 is urged into abutting relation with a shoulder 43 formed in the inner surface of the housing wall. As shown particularly in FIG. 4, the slot 41 and spring clip 40 are shaped whereby rotation of the stator is prevented.

In the embodiment of FIGS. 5 and 6, the housing 10 has an interior chamber of a size substantially greater than the diameter of the stator 11. A support structure, in the form of a three-leg ring, is associated with the stator and housing for accurate positioning and retention of the stator in the desired position. The ring 50 has a series of radially-extending legs 51, 52 and 53 formed integrally therewith and extending outwardly to the inner surface of the housing wall. As shown in FIG. 6, each of these legs has an outer face 55 which is in interference fit relation with the inner surface of the housing wall. A retaining screw 56 associated with each leg secures the leg to the housing to position the ring and prevent axial and rotational movement.

With the same operating temperature range as previously described, the ring 50 is formed of a material, such as aluminum, having a higher rate of thermal expansion than the stator 11. As discussed in connection with the housing 10 and stator 11 in connection with the embodiment of FIGS. 1 to 4, the dimensions of the stator 11 and ring 50 are selected to have a line-to-line fit at a temperature above the normal maximum temperature whereby there is an interference fit therebetween throughout the normal operating temperature range. The inner surface of the ring 50 is provided with longitudinal grooves or cut-outs 60, 61 and 62 to provide contact sections 63, 64 and 65 therebetween which are in interference fit relation with the outer surface of the stator 11.

In considering the dimensions of the integral legs 51–53, it will be recognized that the effective length of the legs will decrease after initial assembly and return of the stator and ring to room temperature because of a bending motion of the ring 50 as provided by the longitudinal groove 60–62. Therefore, initial length of the legs 51–53, as measured from the geometric center of the ring, must be slightly larger than one-half of the inner diameter of the housing 10. Additionally, as the temperature of the assembly varies, the effective length of the legs will change, by expansion or contraction, at a rate dependent upon the relative expansion rates of the ring 50 and the stator 11 and the amount of deflection caused by the interference fit between. By carefully choosing the thickness of the ring 50, the ratio and degrees of arc between the longitudinal grooves 60–62, and the interference fit contact sections 63–65 and the material of the ring 50, the effective length of the legs can be made to expand at the same linear rate as the magnesium housing, even though the ring and legs may be formed of aluminum. This result is accomplished by utilizing a "deflecting arch" feature as provided by the longitudinal grooves or cut-outs 60–62. The three legs 51–53 are centered over each of the longitudinal grooves 60–62, such that the contact areas or points between the ring and the outer surface of the stator and the legs are 60° apart. As the stator and ring are assembled, the radius of the stator at the point of contact with the ring will decrease by inward deflection due to the interference fit force. At the same time, the radius of the ring 50 will tend to increase at the contact points or areas for the same reasons. This outward radial deflection of the ring 50 at the contact points or areas causes an inward deflection in the area of the longitudinal grooves. This results in a reduction in the effective length of the three legs which interface with the inner surface of the housing 10.

Well known deflection equations state that, for a three-contact point design, the center of the groove or cut-out area will deflect inward 89% of the outward deflection at the contact points. This is a maximum value and is only valid when the contact points are of small area.

As the area of a contact point increases, the ratio of deflection becomes less than 89%. As the contact points enlarge, the well known deflection equations are less accurate and trial hardware must be fabricated to establish the proper design.

The design process involves the step of first establishing the interference fit between the stator 11 and the ring 50 and, assuming that there is to be a line-to-line fit at 400° F. and that the stator 11 has an outer diameter of four inches, for example, it can then be calculated, with the stator being of iron and the ring of aluminum, that the inner diameter of the ring 50 should be 3.992 inches. Expansion of the ring 50 to 400° F. will result in increasing the inner diameter thereof to a dimension to provide the line-to-line fit.

As the next step, a determination is made as to the ratio of deflection between the ring 50 and stator 11, taking into account the total deflection which is the difference between the outer diameter of the stator and the inner diameter of the ring and, in one example, the outward deflection of the ring 50 at the contact points is 0.0049 inch. The next step is to establish the fit between the outer faces 55 of the legs 51–53 and the inner surface of the housing 10, with there being a requirement for the line-to-line fit at 400° F. In one example, with the inner diameter of the housing 10 being 6.8 inches at 70° F., the effective outer diameter defined by the faces 55 of the legs at 70° F. is found to be 6.8045 inches. This establishes a required deflection of 0.0045 inch and it can be checked and found that 89% of the value of the outward deflection of the aluminum ring at the contact points is 0.0044 inch. This establishes that the initial assembly of the parts will result in sufficient inward arching of the ring 50 in the area of the grooves to result in effective inward movement of the legs a sufficient amount to effectively bring the outer diameter of the legs to the value equal to the inner diameter of the housing.

The foregoing relation can be checked by establishing that, at room temperature, for example 70° F., there is an interference fit of 0.0001 inch, since the effective outer diameter of the ring legs 51–53 is 6.8001 because of the interference fit thereof onto the stator 11. In calculating expansion that occurs at 350° F., it is found that the inner diameter of the housing 10 is 6.8283 inches, while the effective outer diameter of the ring legs 51–53 is 6.8284 inches, which results in maintaining the interference fit of 0.0001 inch. A similar analysis can be made for −65° F. to show that the fit between the ring legs and the housing 10 remains constant.

With the foregoing, it will be seen that with judicious selection of the materials of the ring 50 and the housing 10, as for example aluminum and magnesium, respectively, along with the thickness of the ring and the ratio between the longitudinal grooves 60–62 and the contact sections 63–65, it is possible to maintain the uniform interference fit between the leg surfaces 55 and the interior surface of the housing 10.

I claim:

1. A generator operable over a wide range of temperatures and having a housing of a lightweight metal with a stator mounted therein and a rotor mounted for rotation relative to the stator, said stator being formed of a metal having a lower thermal expansion rate than the housing metal and said stator having an outer surface engaging an inner surface of the housing with an interference fit throughout the operating temperature range of the generator, a plurality of longitudinal grooves formed in one of said surfaces to permit bending of said housing in the area of said grooves when the generator is operating in the lower part of said temperature range, and means coacting between the stator and the housing and exerting an axial force on the stator to hold the stator in position if the normal operating temperature range is exceeded and the interference fit is lost.

2. A generator as defined in claim 1 wherein said coacting means comprises an annular shoulder within the housing against which the stator abuts, and spring clip means urging the stator against the shoulder.

3. A generator as defined in claim 2 wherein said spring clip means includes a spring clip carried by the stator and which engages a shaped opening in the housing to hold the stator against rotation.

4. A generator having a lightweight housing of a material such as magnesium having a high thermal expansion rate, a stator within the housing and spaced a distance from the inner wall of the housing and formed of a material such as iron having a relatively low thermal expansion rate and, means for holding said stator fixed to said housing throughout the operating temperature range of the generator comprising a ring member of a material such as aluminum having a thermal expansion rate intermediate the materials of said housing and stator, said ring member surrounding the stator and having a plurality of interference fit limited contact areas with said stator with cut-outs in the surface of the ring member defining grooves therebetween, and a plurality of integral legs extending radially outward from said ring member and in interference fit relation at their outer ends with the interior of said housing, said interference fit relations being maintained throughout the operating temperature range of the generator, each of said legs being located intermediate a pair of said limited contact areas whereby said legs move inwardly as the grooves arch inwardly by the placement of the ring member on the stator with an interference fit to have the outer ends of the legs positioned for an interference fit with the housing, and with the last-mentioned interference fit being maintained as the operating temperature of the generator goes up because of said legs expanding at the same rate as the housing.

* * * * *